United States Patent
Shin

(10) Patent No.: US 8,261,311 B2
(45) Date of Patent: Sep. 4, 2012

(54) APPARATUS AND METHOD FOR TRANSMITTING VIDEO DATA FROM A MOBILE COMMUNICATION TERMINAL

(75) Inventor: Sang-Cheol Shin, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1350 days.

(21) Appl. No.: 11/064,280

(22) Filed: Feb. 23, 2005

(65) Prior Publication Data

US 2005/0188414 A1    Aug. 25, 2005

(30) Foreign Application Priority Data

Feb. 24, 2004 (KR) .................. 10-2004-0012388

(51) Int. Cl.
  *H04N 7/173* (2011.01)
(52) U.S. Cl. ....................... 725/109; 725/139
(58) Field of Classification Search .......... 715/723–726; 725/37–62, 109–110, 112–121, 131–142, 725/151–153, 86–105
See application file for complete search history.

(56) References Cited

U.S. PATENT DOCUMENTS

| | | | |
|---|---|---|---|
| 6,597,375 B1 | 7/2003 | Yawitz | |
| 7,356,244 B2 * | 4/2008 | Yu | 725/37 |
| 2002/0019984 A1 * | 2/2002 | Rakib | 725/111 |
| 2002/0031333 A1 * | 3/2002 | Mano et al. | 386/52 |
| 2002/0047892 A1 | 4/2002 | Gonsalves | |
| 2002/0056123 A1 * | 5/2002 | Liwerant et al. | 725/87 |
| 2002/0105670 A1 * | 8/2002 | Maruyama | 358/1.14 |
| 2002/0164956 A1 | 11/2002 | Maltz et al. | |
| 2002/0174430 A1 * | 11/2002 | Ellis et al. | 725/46 |
| 2003/0070182 A1 * | 4/2003 | Pierre et al. | 725/135 |
| 2003/0097659 A1 * | 5/2003 | Goldman | 725/89 |
| 2003/0103168 A1 * | 6/2003 | Lamb | 348/734 |
| 2003/0123621 A1 | 7/2003 | Fukuda | |
| 2004/0059775 A1 * | 3/2004 | Jacobs | 709/203 |
| 2004/0187160 A1 * | 9/2004 | Cook et al. | 725/94 |
| 2005/0066362 A1 * | 3/2005 | Rambo | 725/43 |
| 2005/0097623 A1 * | 5/2005 | Tecot et al. | 725/136 |
| 2005/0172319 A1 * | 8/2005 | Reichardt et al. | 725/52 |

FOREIGN PATENT DOCUMENTS

| | | |
|---|---|---|
| CN | 1476238 | 2/2004 |
| EP | 1 246 417 A2 | 10/2002 |
| EP | 1359528 | 11/2003 |
| EP | 1359528 A2 * | 11/2003 |
| GB | 2 386 299 A | 9/2003 |
| JP | 2002-152675 | 5/2002 |
| JP | 2002-171469 | 6/2002 |
| JP | 2002-344914 | 11/2002 |
| JP | 2002-354452 | 12/2002 |
| JP | 2003-244616 | 8/2003 |
| WO | WO 02/078344 A | 10/2002 |
| WO | WO 03/005717 | 1/2003 |

* cited by examiner

*Primary Examiner* — Scott Beliveau
*Assistant Examiner* — Michael Telan
(74) *Attorney, Agent, or Firm* — Lee, Hong, Degerman, Kang & Waimey

(57) ABSTRACT

An apparatus and method for transmitting video data to a receiving terminal is disclosed. The apparatus comprises an event processing unit for outputting a signal to store a selected portion of the video data that is currently being reproduced, a video data reproduction unit for receiving the signal from the event processing unit and storing the selected portion of the video data that is currently being reproduced in response to the outputted signal while reproducing the video data. A message transmission unit is further provided for attaching the stored selected portion of the video data that is currently being reproduced to a message and transmitting the message to the receiving terminal. A data storage unit stores the video data and the selected portion of the video data.

14 Claims, 8 Drawing Sheets

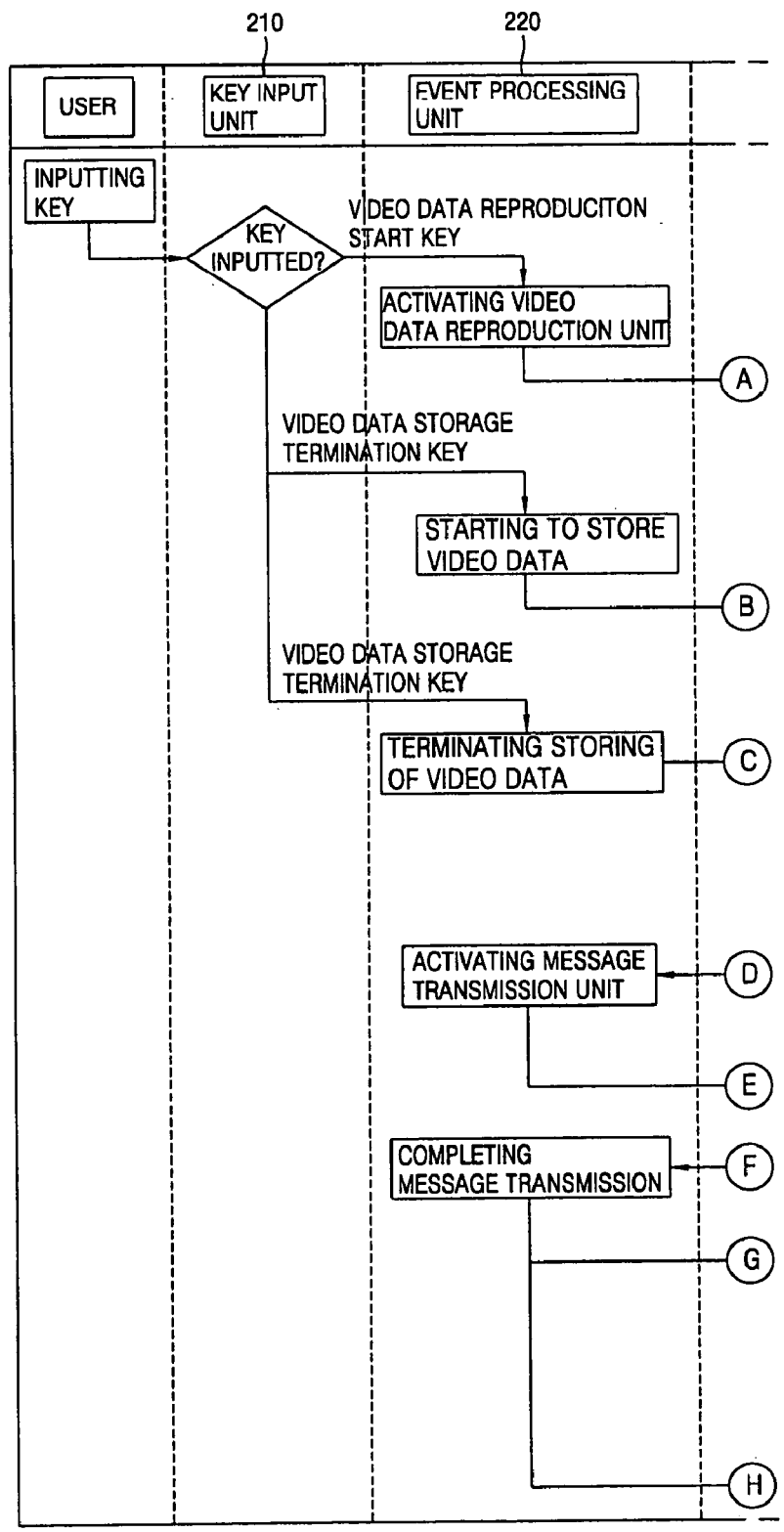

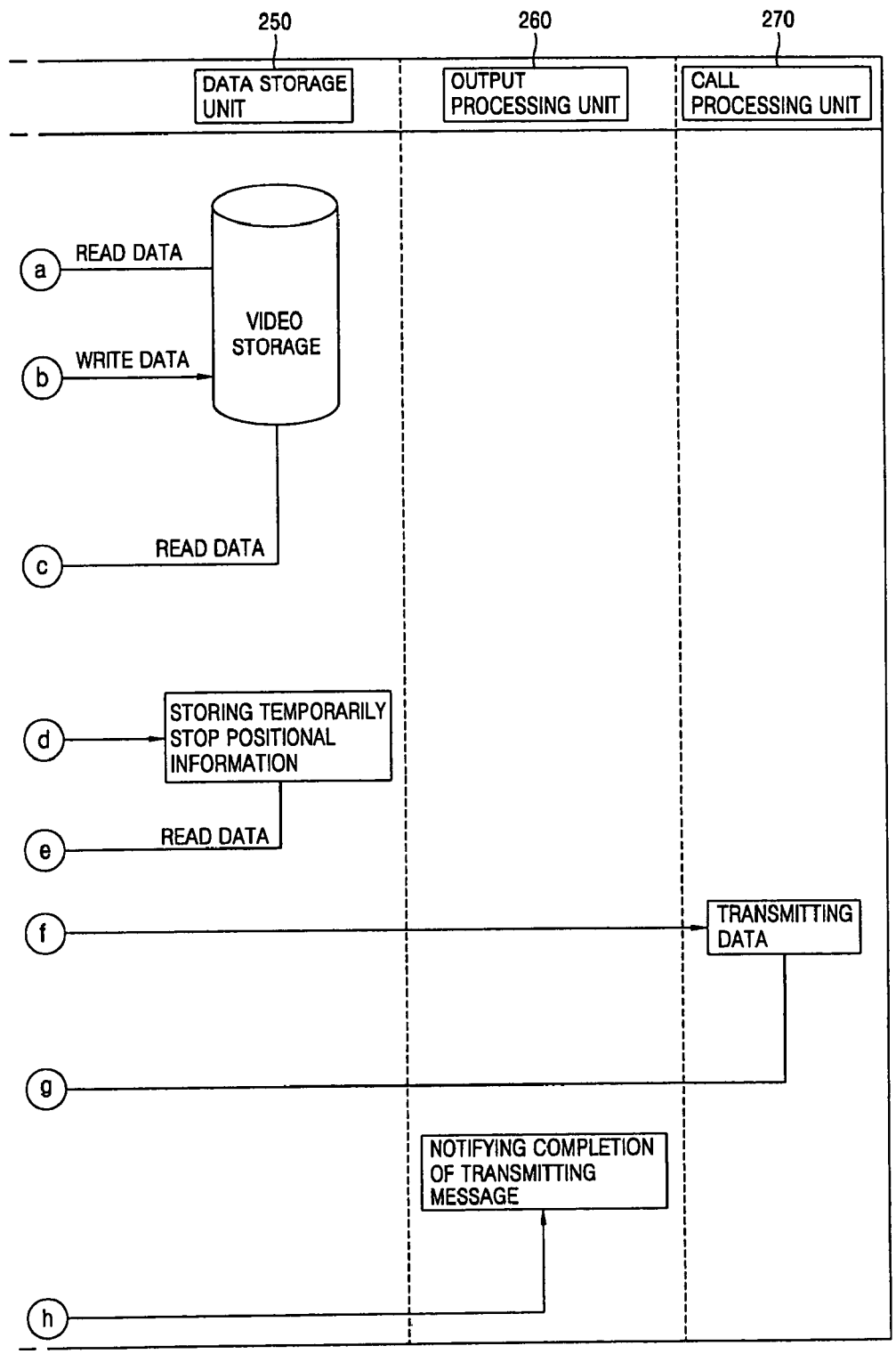

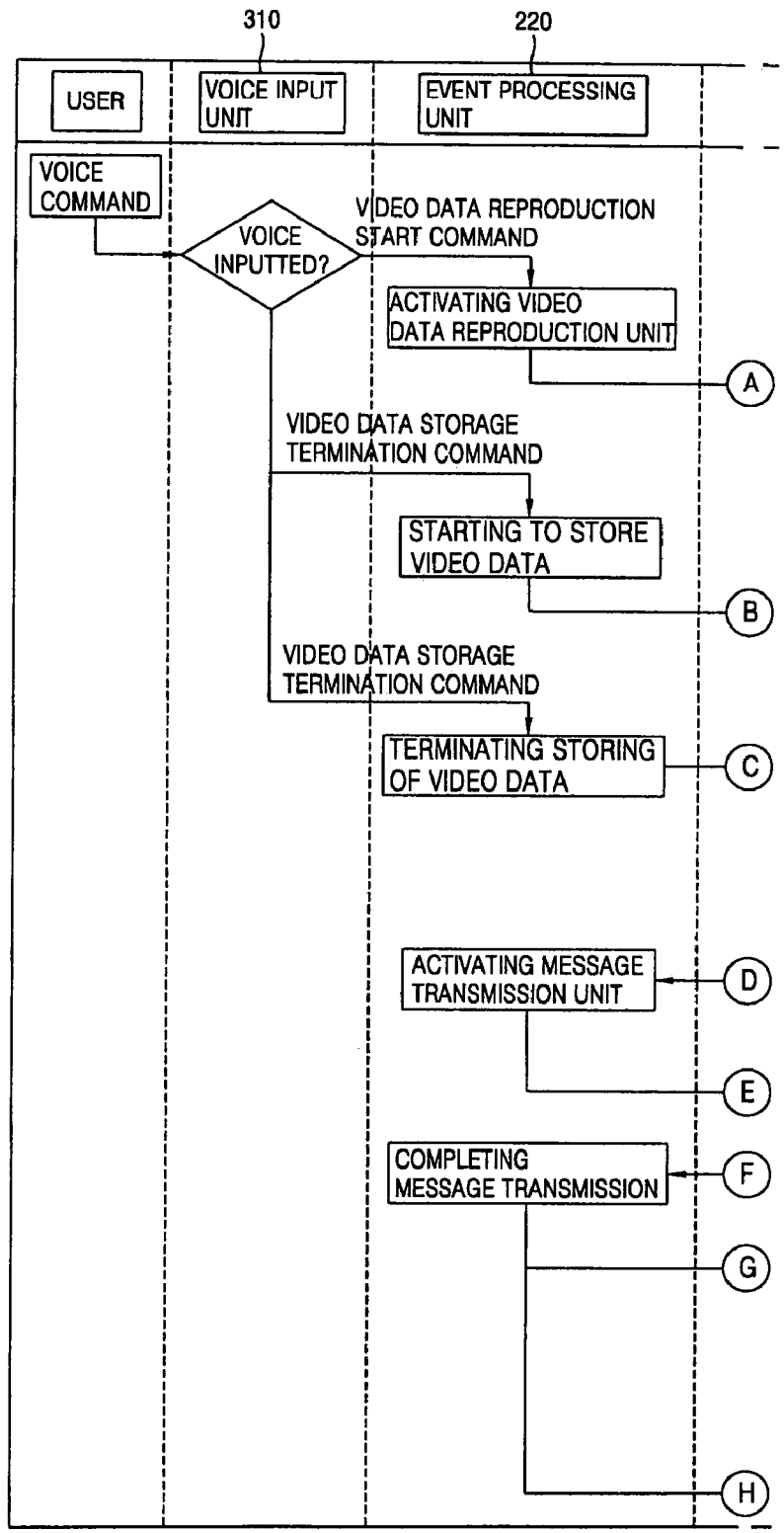

APPARATUS AND METHOD FOR TRANSMITTING VIDEO DATA FROM A MOBILE COMMUNICATION TERMINAL

CROSS-REFERENCE TO RELATED APPLICATIONS

Pursuant to 35 U.S.C. §119(a), this application claims the benefit of earlier filing date and right of priority to Korean Application No. 10-2004-0012388, filed on Feb. 24, 2004, the contents of which are hereby incorporated by reference herein in its entirety.

BACKGROUND OF THE INVENTION

1. Field of the Invention

The present invention relates to an apparatus and method for transmitting video data from a mobile communication terminal.

2. Description of the Related Art

With the increase in the availability of highly integrated memory and the transmission speed of large-scale data, a mobile communication terminal ("terminal") may store and transmit a text message, a still image or a melody, and record, store, edit and transmit video.

Users are increasingly recording video through the terminal or transmitting stored video to other terminals.

During transmission of video data or an audio signal synchronized with a video signal between terminals, a conventional terminal cannot transmit the video data when the video data is being reproduced. A user must stop reproducing the video data, write a message, attach the video data to be transmitted to the message, and transmit the message to another terminal. In other words, conventional terminals transmit video data by separately implement reproduction of video data and transmission of a message to which the video data file is attached.

FIGS. 1A and 1B illustrate a conventional terminal apparatus, including signal flow through the apparatus, for transmitting video data from a terminal.

As shown in FIGS. 1A and 1B, the apparatus for transmitting the video data includes a key input unit 110, an event processing unit 120, a video data reproduction unit 130, a message transmission unit 140, a data storage unit 150, an output processing unit 160, and a call processing unit 170. The descriptions for these units are given below.

Upon a user pressing an option key, the key input unit 110 recognizes the pressed key. The key input unit 110 determines, for example, if the pressed key is a video data reproduction start key, a video data reproduction stop key, or a message transmission start key. The key input unit 110 transmits the result of the determination to the event processing unit 120.

The event processing unit 120 notifies the video reproduction unit 130 and the message transmission unit 140 of an event. Examples of an event include a video data reproduction start event, a video data reproduction stop event, and a message transmission start event.

The video data reproduction unit 130 reads video data selected by the user from the data storage unit 150 and reproduces the video data.

The message transmission unit 140 writes a message, attaches a selected video data file to the written message, and attempts to transmit the message attached to a video data file according to a data transmission protocol.

The video data file and related information are stored in the data storage unit 150.

The output processing unit 160 audiovisually notifies a user of reproduction information of the video data and terminal information.

The call processing unit 170 transmits the message to a receiving terminal in accordance with directions from the message transmission unit 140.

Hereinafter, a method for transmitting video data from a conventional terminal will be described with reference to signal flow diagram of FIGS. 1A and 1B.

A user presses a video data reproduction key after selecting the video data to be reproduced from a list of videos stored in the data storage unit 150. The key input unit 110 determines that the pressed key is a video data reproduction start key. The key input unit 110 notifies the event processing unit 120 of the determination. The event processing unit 120 notifies the reproduction unit 130 of a video data reproduction start event corresponding to the determination. The event processing unit 120 activates the video data reproduction unit 130 and notifies the video data reproduction unit 130 of selected video data information.

The video data reproduction unit 130 reads the selected video data from the data storage unit 150 and reproduces the read video data.

To transmit the video data currently being reproduced, the user stops reproducing the video data.

The user presses a key to stop reproduction of the video data currently being reproduced. The key input unit 110 determines the pressed key is intended to stop video data reproduction, and notifies the event processing unit 120 of the determination. The event processing unit 120 notifies the video data reproduction unit 130 to stop reproducing video data and deactivates the video data reproduction unit 130.

The video data reproduction unit 130 stops reproducing the video data and notifies the event processing unit 120 that reproduction has stopped. The event processing unit 120 notifies the output processing unit 130 that the video data reproduction unit 130 is deactivated. The output processing unit 160 indicates, on a terminal screen the video data reproduction unit 130 is deactivated.

To transmit the video data for which reproduction of has stopped, the user presses a message transmission key. The key input unit 110 determines the pressed key is for message transmission and notifies the event processing unit 120. The event processing unit 120 notifies the message transmission unit 140 of a message transmission event corresponding to the pressed key and activates the message transmission unit 140.

The user writes a message utilizing the message transmission unit 140. The message transmission unit 140 attaches the written message to a selected video data file, and attempts to transmit the message through the call processing unit 170.

Upon complete transmission of the message, the message transmission unit 140 notifies the event processing unit 120 and the event processing unit 120 notifies the output processing unit 160.

The output processing unit 160 audiovisually notifies the user that transmission of the message, and the video data file has been completed.

In summary, a user of a conventional terminal desiring to transmit a video data currently being reproduced must stop reproducing the video data and transmit a message to which the entire video data file is attached. To transmit a portion of the video data, the user is required to edit the video data using editing software before transmission. An edited version of the video data and the editing software require separate storage locations.

Therefore, there is a need for an improved apparatus and method for transmitting video data that provides additional advantages over conventional terminals and increases user convenience.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In one embodiment, an apparatus for transmitting video data to a receiving terminal is disclosed. The apparatus comprises an event processing unit for outputting a signal to store a selected portion of the video data that is currently being reproduced and a video data reproduction unit for receiving the signal from the event processing unit and storing the selected portion of the video data that is currently being reproduced in response to a signal from the event processing unit during reproduction of the video data. A message transmission unit is further provided for attaching the stored selected portion of the video data that is currently being reproduced to a message and transmitting the message to the receiving terminal. A data storage unit stores the video data and the selected portion of the video data.

A user may designate the selected portion of the video data. The video data reproduction unit preferably, upon completion of storing the selected portion of the video data, temporarily stops reproducing the video data.

In another embodiment, a method of transmitting video data to a receiving terminal is disclosed. The method comprises storing a selected portion of the video data while the video data is being reproduced, attaching the stored selected portion of video data to a message, and transmitting the message to the receiving terminal.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments.

FIGS. 2A-2C illustrate a structure and signal flow of an apparatus for transmitting video data to a receiving terminal according to a first embodiment of the present invention.

FIGS. 3A-3C illustrate a structure and signal flow of an apparatus for transmitting video data to a receiving terminal according to a second embodiment of the present invention.

DETAILED DESCRIPTION OF THE PREFERRED EMBODIMENTS

The present invention relates to an apparatus and method for efficiently transmitting video data while minimizing the resources required by a mobile communication terminal.

Although the invention is illustrated with respect to a mobile terminal, it is contemplated that the invention may be utilized wherever it is desired to efficiently transmit data, such as video data, that requires editing in a communication system while minimizing the size of a data storage location and reducing user inconvenience. Reference will now be made in detail to the preferred embodiments of the present invention, examples of which are illustrated in the accompanying drawings.

The preferred embodiments transmit video data facilitating increased user convenience and data storage efficiency. More specifically, the preferred embodiments specify a portion of the video data for transmission from currently reproduced video data. The preferred embodiment transmits the specified portion of the video data including an attached message.

Figure 1A:
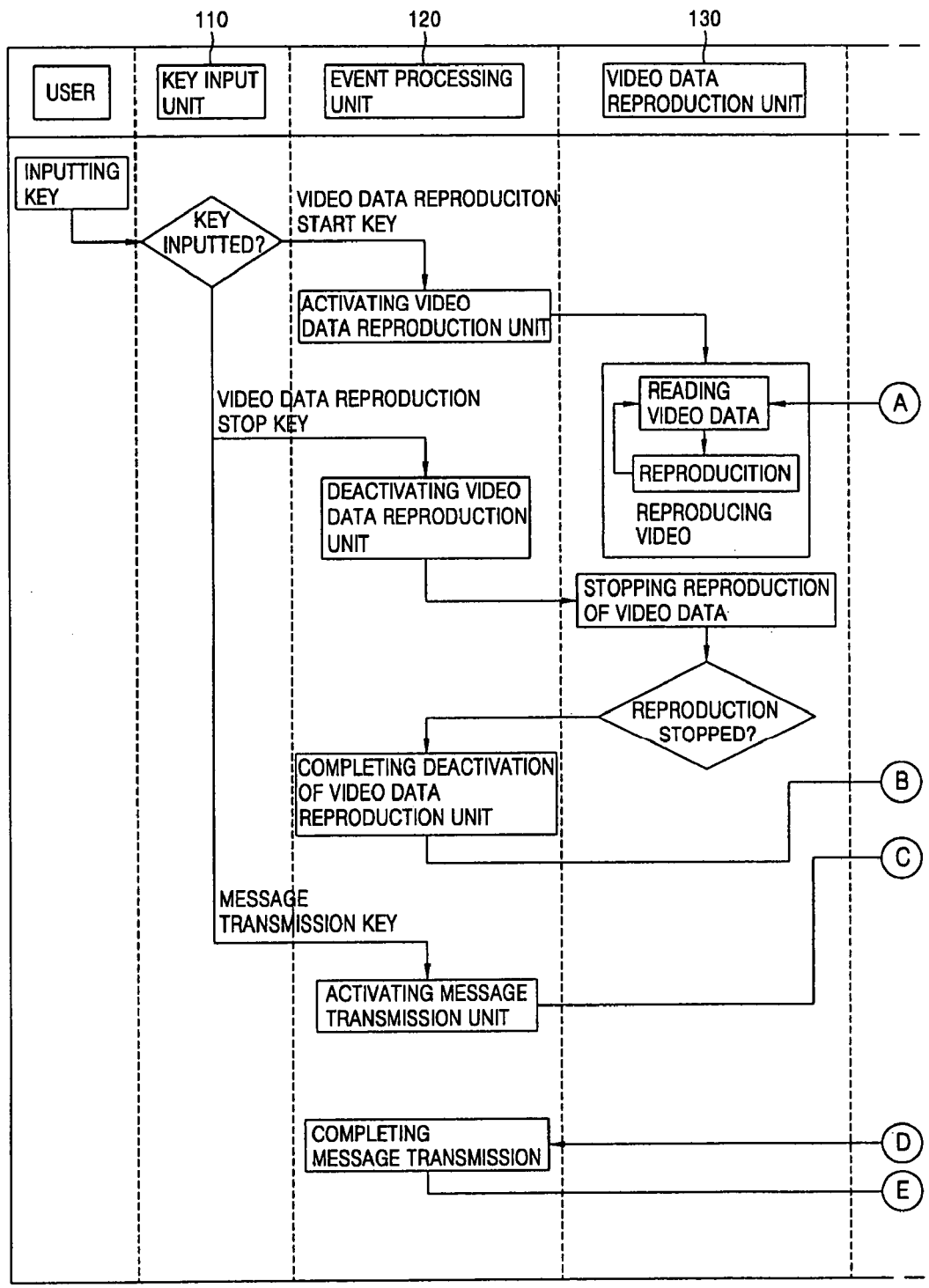
FIGS. 1A and 1B illustrate a structure and signal flow of an apparatus for transmitting video data to a receiving terminal according to the conventional art.
Figure 1B:
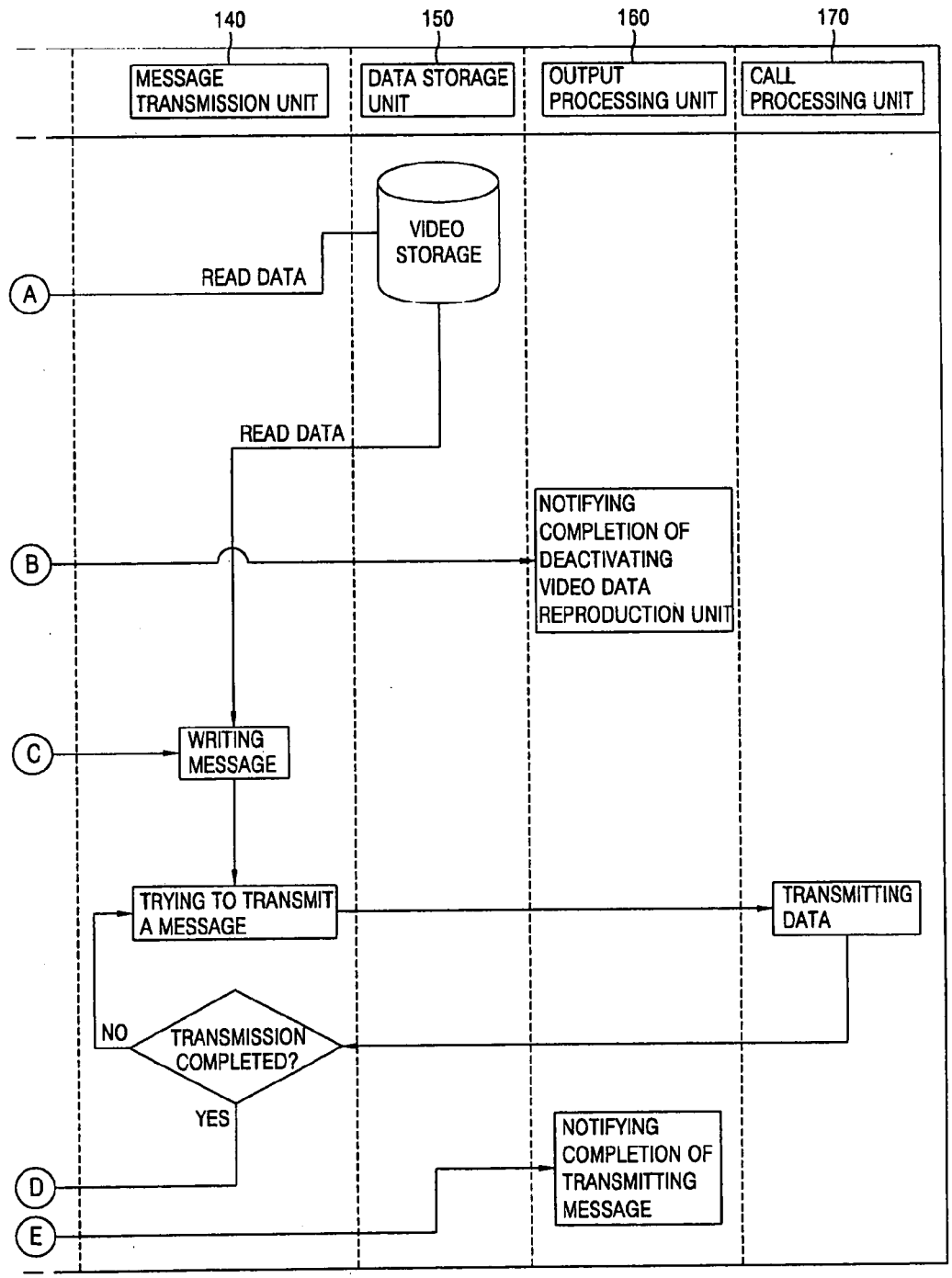
Figure 2B:
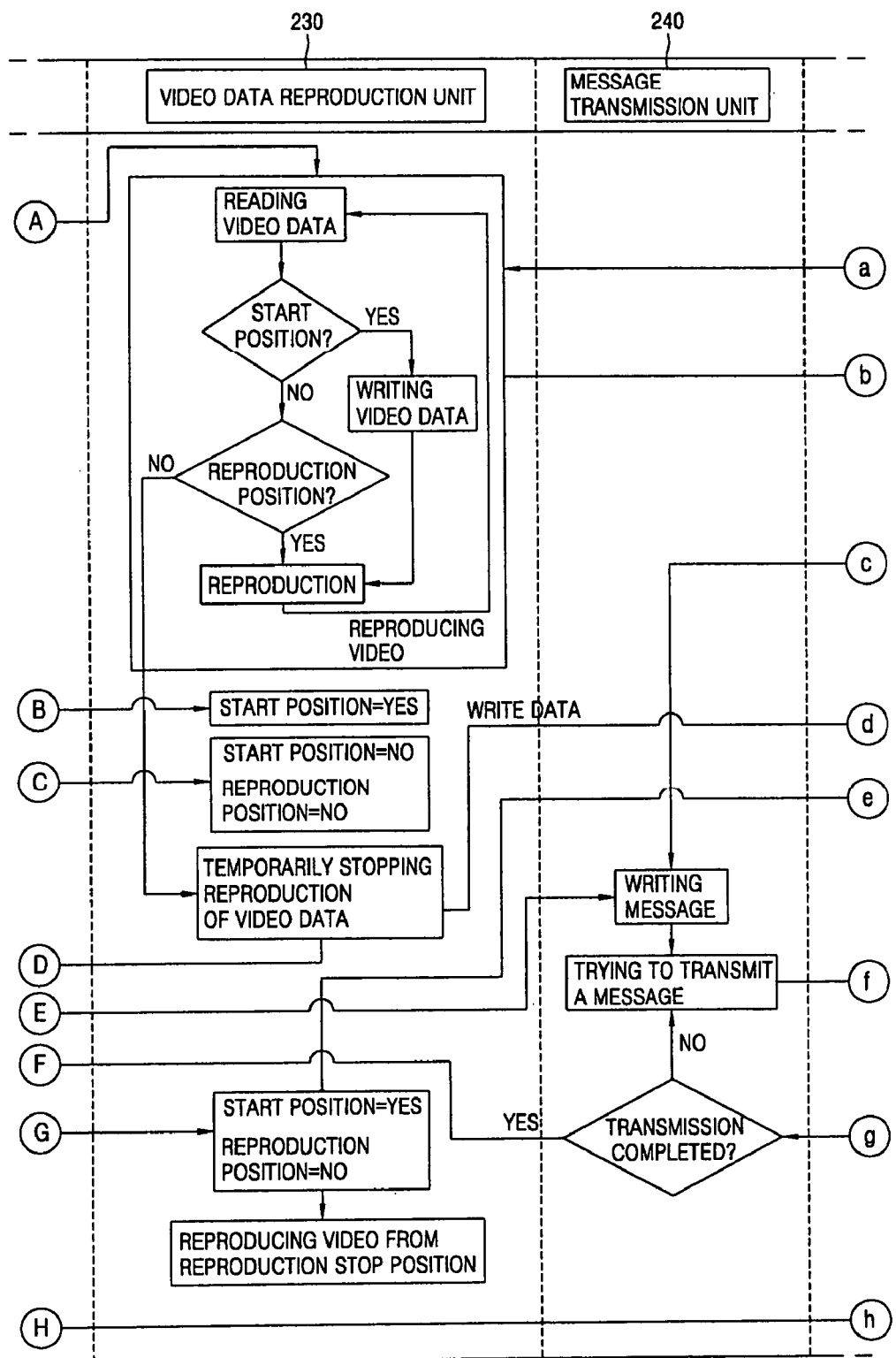

FIGS. 2A-2C illustrate a structure and signal flow of an apparatus for transmitting video data to a receiving terminal according to a first embodiment of the present invention.

Referring to FIGS. 2A-2C, an apparatus for transmitting the video data from the terminal includes a key input unit 210, an event processing unit 220, a video data reproduction unit 230, a message transmission unit 240, a data storage unit 250, an output processing unit 260, and a call processing unit 270. Functions of each of these constituent elements are discussed below.

When a user presses an option key, the key input unit 210 recognizes that the option key has been pressed. The key input unit 210 determines the pressed key. The pressed key, for example, may be a video data reproduction start key, a video data storage start key, or a video data storage termination key. The key input unit 210 transmits the determination to the event processing unit 220.

The event processing unit 220 notifies the video data reproduction unit 230 and the message transmission unit 140 of an event. The event, for example, may be a video data reproduction start event, a video data storage start event, or a video data storage termination event corresponding to the pressed key.

The video data reproduction unit 230 reads video data selected by the user from the data storage unit 250, and reproduces the read video data. The video data reproduction unit 230 stores a selected portion of the video data specified by a user while the selected video data is being reproduced. The data storage unit 250 temporarily stores position information of the video data that is currently being reproduced.

The message transmission unit 240 writes a message and attaches the video data selected for transmission to the message. The message transmission unit 240, in accordance with a data transmission protocol, attempts transmission of the message.

The data storage unit 250 stores the video data, the selected portion of the video data specified by the user, the stop position information of the video data currently being reproduced, and any related information.

The output processing unit 260 audiovisually notifies the user regarding information related to reproducing the video data and information about the terminal.

The call processing unit 270 transmits the message attached to the video data to a receiving terminal in accordance with instructions from the message transmission unit 240.

A method for transmitting video data to a receiving terminal according to the first embodiment of the present invention will be described with reference to the signal flow diagram shown in FIGS. 2A-2C.

Upon a user pressing a video data reproduction start key, the key input unit 210 recognizes the pressed key. The event processing unit 220 transmits a video data reproduction event, corresponding to the recognized pressed key, and video data reproduction information to the video data reproduction unit 230. The video data reproduction unit 230 reads the corresponding video data from the data storage unit 250. The video data reproduction unit 230 reproduces the read video data in accordance with the transmitted video information and the video data reproduction event. The user designates a start position and a stop position for a portion of the video data selected for transmission while the video data is being reproduced.

The video data reproduction unit 230 temporarily stores, from the start position to the stop position, video data in the data storage unit 250, temporarily stops reproduction of the video data upon completion of video data storage, and temporarily stores the stop position information of video data currently being reproduced in the data storage unit 250. The event processing unit 220 recognizes the reproduction of the video data temporarily stopped and reactivates the message transmission unit 240.

The message transmission unit 240 attaches the temporarily stored video data to a user message. The call processing unit 270 transmits the message attached to the video data to a receiving terminal. The output processing unit 260, upon complete transmission of the message, audiovisually notifies a user of message transmission. The reproduction unit 230 resumes reproducing the video data based on the stored stop position information.

Hereinafter, the method of transmitting video data from a terminal according to the first embodiment of the present invention will be described in more detail.

After searching a list of the video data stored in the data storage unit 250, a user presses the video data reproduction start key, and video data is selected. The key input unit 210 determines that the video data reproduction start key has been pressed. The key input unit 210 notifies the event processing unit 220. The event processing unit 220 notifies the video data reproduction unit 230 of a video data reproduction start event and information regarding the selected video data, and reactivates the video data reproduction unit 230.

The video data reproduction unit 230 reads the selected video data from the data storage unit 250 and reproduces the selected video data.

When a portion of the selected video data is reproduced, a user designates, via the key input unit 210, a start position used for transmitting a portion of the selected video data. The key input unit 210 notifies the event processing unit 220 that a video data storage start key has been pressed. The event processing unit 220 notifies the video processing unit 230 that a portion of the video data currently being reproduced is the start position for transmission.

The video data reproduction unit 230 continues reproducing the video data and stores the video data from the start position in the data storage unit 250.

The user designates, via a key stroke, a stop position for the portion of the video data for transmission. The key input unit 210 notifies the event processing unit 220 that the designated stop position of the video data is to be transmitted. The event processing unit 220 notifies the video data reproduction unit 230 upon completion of storing the video data.

The video data reproduction unit 230 stops storing the video data and temporarily stops reproduction of the video data. The video data reproduction unit 230 temporarily stores stop position information of the video data currently being reproduced in the data storage unit 250, and notifies the event processing unit 220 that reproduction of the video data has stopped.

The event processing unit 220 activates the message transmission unit 240. The message transmission unit 240 attaches the video data temporarily stored in the data storage unit 250 to a message. The message transmission unit 240 attempts to transmit the message to a receiving terminal.

Upon complete transmission of the message, the message transmission unit 240 deletes the video data temporarily stored in the data storage unit 250. The message transmission unit 240 notifies the event processing unit 220 that the temporarily stored video data has been deleted upon completion of message transmission.

The event processing unit 220 reactivates the video data reproduction unit 230. The video data reproduction unit 230 resumes reproduction of the video based on the stop position information stored in the data storage unit 250.

Figure 3B:
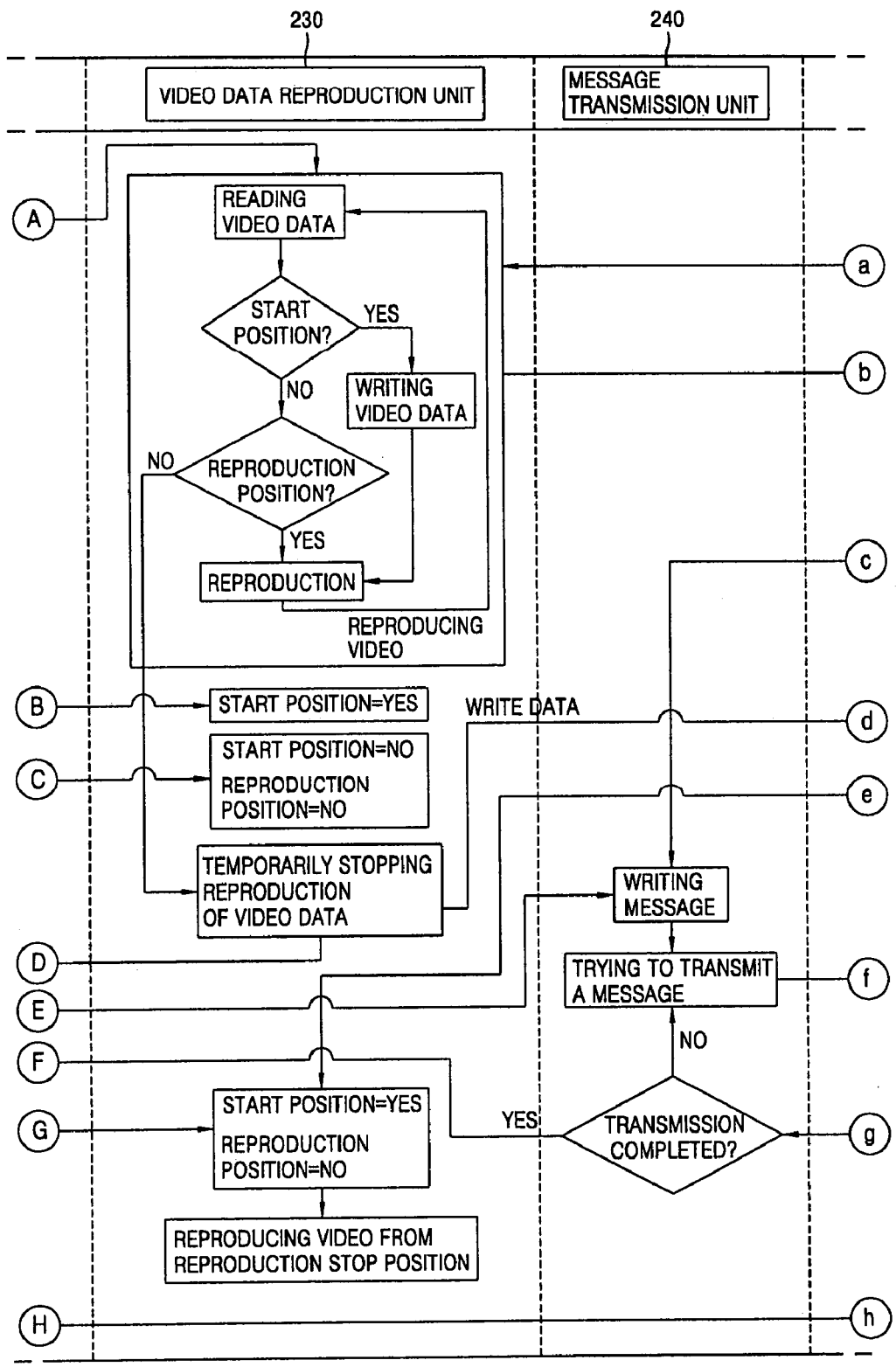
Figure 3C:
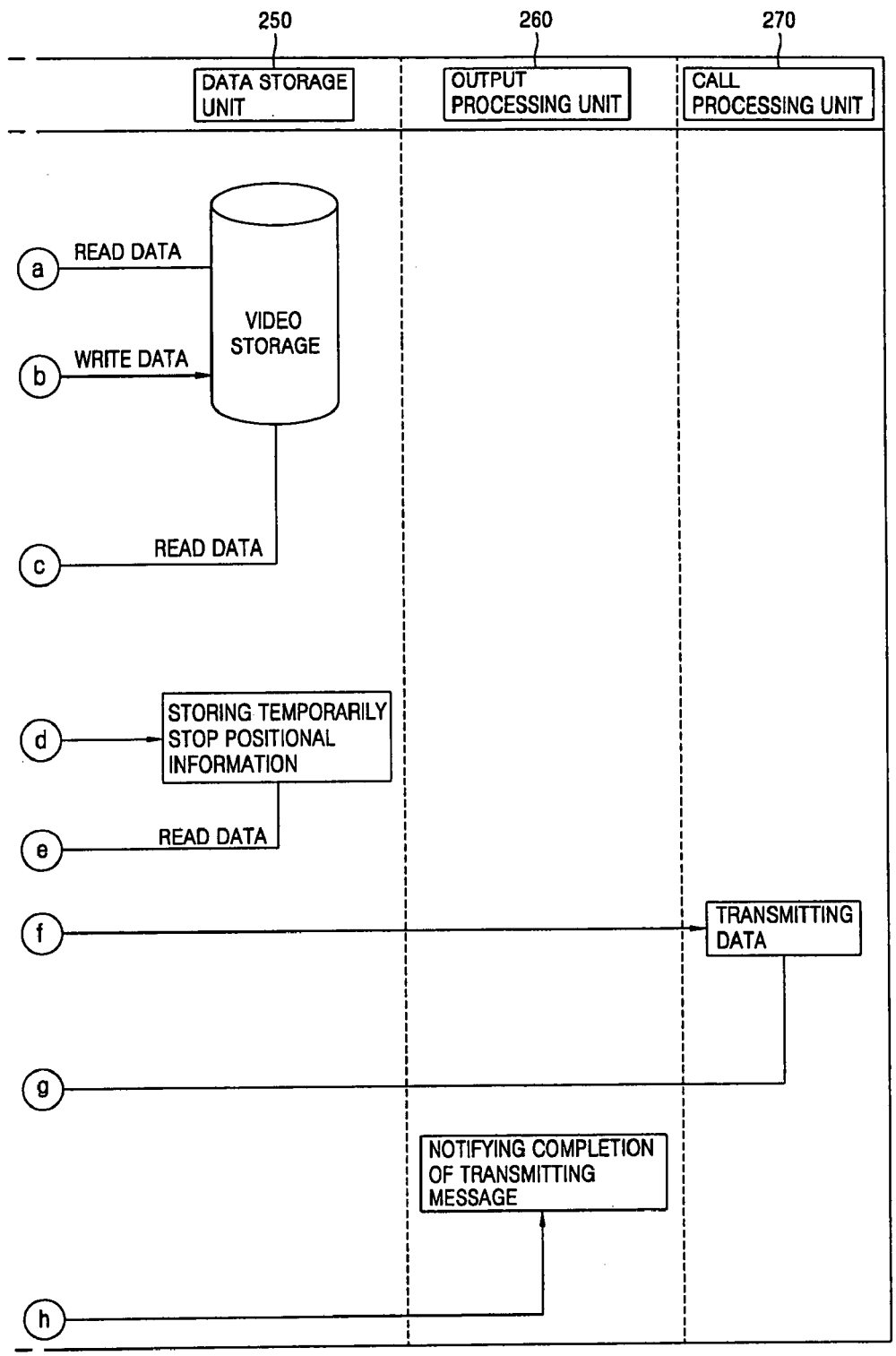

FIGS. 3A-3C illustrate a structure and signal flow of an apparatus for transmitting video data to a receiving terminal according to a second embodiment of the present invention.

Referring to FIGS. 3A-3C, the apparatus includes a voice input unit 310, an event processing unit 220, a video data reproduction unit 230, a message transmission unit 240, a data storage unit 250, an output processing unit 260, and a call processing unit 270. Functions of each of the units are described below.

Upon a user issuing an optional voice command, the voice input unit 310 recognizes the voice command and determines the contents of the voice command. The voice command may be a video data reproduction start command, a video data storage start command, or a video data storage termination command. The voice input unit 310 transmits the result of the determination to the event processing unit 220.

The event processing unit 220 notifies the video data reproduction unit 230 and the message transmission unit 240 of the event corresponding to the voice command.

The video data reproduction unit 230 reads the video data selected by the user from the data storage unit 250 and reproduces the read video data. The video data reproduction unit 230 stores a selected portion of a video data specified by the user during reproduction of the selected video data and stop position information of the video data currently being reproduced in the data storage unit 250.

The message transmission unit 240 writes a message, attaches the video data selected for transmission to the written message, and attempts to transmit the message according to a data transmission protocol.

The data storage unit 250 stores the video data, the selected portion of the data specified by the user, the temporarily stored stop position information of the video data currently being reproduced, and related information.

The output processing unit 260 notifies the user regarding reproduction information regarding the video data and terminal information.

The call processor 270 transmits the message and the selected portion of the video data to the receiving terminal in accordance with instructions from the message transmission unit 240.

A method of transmitting video data to a receiving terminal according to the second embodiment of the present invention will be described with reference to the signal flow as shown in FIGS. 3A-3C.

The user issues a video data reproduction start voice command and the voice input unit 310 recognizes the voice command. The event processing unit 220 transmits a video data reproduction event corresponding to the recognized voice command along with video reproduction information to the video data reproduction unit 230. The video data reproduction unit 230 reads the video data from the data storage unit 250, reproduces the read video data, and stores a specified portion of the video data. While the video data is being reproduced, the user designates a start position and a stop position for transmission of a selected portion of the video data.

The video data reproduction unit 230 temporarily stores the video data, from the designated start position to the designated stop position, in the data storage unit and temporarily stops reproducing the video data until completion of video data storage. The video data reproduction unit 230 temporarily stores stop position information of the video data currently being reproduced in the data storage unit 250. The event processing unit 220 recognizes that reproduction of the video data has been temporarily stopped and activates the message transmission unit 240. The message transmission unit 240 attaches the temporarily stored video data to a message.

The message is attached to the video data for transmission through a call processing unit to the receiving terminal. The output processing unit 260 audiovisually notifies the user that message transmission is complete. The video data reproduction unit 230 resumes reproducing the video data based on the stored stop position information of the video data currently being reproduced in the data storage unit 250.

Hereinafter, the method of transmitting the video of the terminal according to the second embodiment of the present invention will be described in detail.

The user searches a list of the video data stored in the data storage unit 250, selects video data, and issues a video data reproduction voice command. The voice input unit 310 determines the voice command indicates video data reproduction start and notifies the event processing unit 220 of the result. The event processing unit 220 notifies the video data reproduction unit 230 of a video data reproduction start event corresponding to the determination along with information regarding the selected video data and activates the video data reproduction unit 230.

The video data reproduction unit 230 reads the selected video data from the data storage unit 250 and reproduces the read video data.

A portion of the selected video data being reproduced is selected for transmission. If a start position of the portion to be transmitted is designated by a user issuing a voice command, the voice input unit 310 notifies the event processing unit 220 that a video data storage start voice command has been issued. The event processing unit 220 notifies the video data reproduction unit 230 that the portion currently being reproduced is the start position of the portion to be transmitted.

The video data reproduction unit 230 continues reproducing the video data and stores the video data from the designated start position in the data storage unit 250.

The user designates a stop position for a portion of the video data selected for transmission by issuing a voice command. The voice input unit 310 notifies the event processing unit 220 that the designated stop position is for the video data to be transmitted. The event processing unit 220 notifies the video data reproduction unit 230 upon termination of video data storage.

The video data reproduction unit 230 terminates video data storage and temporarily stops reproducing the video data. The video data reproduction unit restores stop position information of the video data currently being reproduced in the data storage unit 250. The video data reproduction unit notifies the event processing unit 220 upon temporarily stopping reproduction of the video data.

The event processing unit 220 activates the message transmission unit 240. The message transmission unit 240 attaches the video data stored in the data storage unit 250 to a message the user has written, and attempts transmission through the call processing unit 270.

When transmission of the message is completed, the message transmission unit 240 deletes the video data temporarily stored in the data storage unit 250. The message transmission unit 240 notifies the event processing unit 220 upon completion of message transmission and deletion of the temporarily stored video data.

The event processing unit 220 reactivates the video data reproduction unit 230. The video data reproduction unit 230 resumes reproducing the video data based on the stored stop position information of the video data currently being reproduced and completes processing of the video transmission.

The present invention provides video data reproduction whereby a user can select a selected portion of the video data for transmission to a specific terminal. After transmission is completed, the video data temporarily stored but previously transmitted is automatically deleted. A separate video editing software and an editing process are not required. Accordingly, a user's convenience is increased, and storage space required for a terminal is reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

Although the present invention is described in the context of a mobile terminal, the present invention may also be used in any wired or wireless communication systems using mobile devices, such as PDAs and laptop computers equipped with wired and wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

What is claimed is:

1. A method of a terminal for transmitting video data to a receiving terminal, the method comprising:

reproducing the video data on a display unit of the terminal upon receiving via an input unit of the terminal a first input triggering reproduction of the video data;

beginning storage of a selected portion of the video data for transmitting to the receiving terminal in a data storage unit of the terminal upon receiving via the input unit of the terminal a second input designating a start position for the selected portion of the video data while the video data is being reproduced by the terminal;

and upon receiving via the input unit a third input designating a stop position for the selected portion of the video data for transmitting to the receiving terminal,(a) stopping reproduction of the video data and storing the stop position for the selected portion of the video data in the data storage unit;

(b) attaching the selected portion of the video data to a message;

(c) transmitting the message with the selected portion of the video data to the receiving terminal;

(d) resuming the reproduction of the video data from the stop position upon completing the transmitting the message with the selected portion of the video data; and (e) deleting the selected portion of the video data stored in the data storage unit, wherein (a) through (e) are sequentially performed without any further user input after being triggered by the third input designating the stop position for the selected portion of the video data.

2. The method of claim 1, further comprising providing notification of a user initiated event.

3. The method of claim 2, wherein the user initiated event is one of a video data reproduction start event, a video data storage start event, and a video data storage termination event.

4. An apparatus for transmitting video data from a terminal, the apparatus comprising:

an event processing unit for outputting a signal to store a selected portion of the video data that is currently being reproduced upon receiving a first input;

a display unit for displaying the video data;

a video data reproduction unit for storing the selected portion of the video data that is currently being reproduced in response to the signal from the event processing unit while the video data is being reproduced;

a message transmission unit for attaching the selected portion of the video data to a message and transmitting the message to a receiving terminal with the selected portion of the video data; and a data storage unit for storing the video data and the selected portion of the video data, wherein a start position of the selected portion of the video data is designated by the first input and a stop position of the selected portion of the video data is designated by a second input, both the first input and the second input are received while the video data is being reproduced, wherein the selected portion of the video data is selected and stored in response to the first input and the second input, wherein, in response to the second input, (a) reproduction of the video data is stopped and the stop position of the video data is stored in the data storage unit, (b) the selected portion of the video data is attached to the message, (c) the message with the selected portion of the video data is transmitted to the receiving terminal, (d) the reproduction of the video data is resumed from the stop position, and (e) the selected portion of the video data stored in the data storage unit is deleted, and wherein (a) through (e) are sequentially performed without any further user input after being triggered by the second input designating the stop position for the selected portion of the video data.

5. The apparatus of claim 4, wherein the event processing unit notifies the video data reproduction unit and the message transmission unit of an event.

6. The apparatus of claim 5, wherein the event is one of a video data reproduction start event, a video data storage start event, and a video data storage termination event.

7. The apparatus of claim 4, further comprising:

a voice input unit configured to recognize a voice command for manipulating the video data.

8. The apparatus of claim 4, wherein the apparatus is a mobile communication terminal.

9. The apparatus of claim 4, further comprising:

an output processing unit configured to audiovisually notify a user of a message transmission upon completion of the message transmission.

10. The apparatus of claim 9, wherein the message transmission unit notifies the event processing unit that the video data has been deleted upon completion of the message transmission.

11. The method of claim 1, further comprising audiovisually notifying a user of a message transmission upon completing the message transmission.

12. The method of claim 1, further comprising notifying a user that the selected portion of the video data has been deleted from the data storage unit upon deleting the selected portion of the video data.

13. The method of claim 1, wherein the input unit comprises a voice input unit configured to recognize a voice command.

14. The apparatus of claim 4, wherein the first input and the second input are received via an input unit comprising a voice input unit configured to recognize a voice command.

* * * * *